United States Patent
Anisimovich et al.

(10) Patent No.: US 9,626,353 B2
(45) Date of Patent: Apr. 18, 2017

(54) ARC FILTERING IN A SYNTACTIC GRAPH

(71) Applicant: ABBYY InfoPoisk LLC, Moscow (RU)

(72) Inventors: Konstantin Anisimovich, Moscow (RU); Konstantin Alekseevich Zuev, Moscow (RU)

(73) Assignee: ABBYY INFOPOISK LLC, Moscow (RU)

( * ) Notice: Subject to any disclaimer, the term of this patent is extended or adjusted under 35 U.S.C. 154(b) by 93 days.

(21) Appl. No.: 14/588,690

(22) Filed: Jan. 2, 2015

(65) Prior Publication Data
US 2015/0199331 A1    Jul. 16, 2015

(30) Foreign Application Priority Data

Jan. 15, 2014    (RU) ................................ 2014101124

(51) Int. Cl.
*G06F 17/27* (2006.01)
*G06K 9/00* (2006.01)
*G06T 7/00* (2017.01)

(52) U.S. Cl.
CPC .......... *G06F 17/271* (2013.01); *G06F 17/277* (2013.01); *G06F 17/2755* (2013.01); *G06K 9/00463* (2013.01); *G06T 7/0093* (2013.01)

(58) Field of Classification Search
CPC ...................................................... G06F 17/28
See application file for complete search history.

(56) References Cited

U.S. PATENT DOCUMENTS

| | | |
|---|---|---|
| 4,706,212 A | 11/1987 | Toma |
| 5,068,789 A | 11/1991 | Van Vliembergen |
| 5,128,865 A | 7/1992 | Sadler |
| 5,146,405 A | 9/1992 | Church |
| 5,175,684 A | 12/1992 | Chong |
| 5,268,839 A | 12/1993 | Kaji |
| 5,301,109 A | 4/1994 | Landauer et al. |
| 5,386,556 A | 1/1995 | Courts et al. |

(Continued)

FOREIGN PATENT DOCUMENTS

| | | |
|---|---|---|
| EP | 2400400 A1 | 12/2001 |
| EP | 1365329 B1 | 10/2009 |
| WO | 2011160204 A1 | 12/2011 |

OTHER PUBLICATIONS

Bolshakov, "Co-Ordinative Ellipsis in Russian Texts: Problems of Description and Restoration", Published in: Proceeding COLING '88 Proceedings of the 12th conference on Computational linguistics—vol. 1 doi>10.3115/991635.991649, 1988, 65-67.

(Continued)

*Primary Examiner* — David Hudspeth
*Assistant Examiner* — Shreyans Patel
(74) *Attorney, Agent, or Firm* — Lowenstein Sandler LLP (57) ABSTRACT

The present disclosure provides methods and systems for performing syntactic analysis of a text. In some implementations the method includes performing rough syntactic analysis of the text, generating a graph of generalized constituents of the text and filtering arcs of the graph of generalized constituents with a combination classifier which includes a tree classifier and one or more linear classifiers. The combination classifier is trained using parallel analysis of an untagged two-language text corpus.

21 Claims, 5 Drawing Sheets

(56) References Cited

U.S. PATENT DOCUMENTS

| | | |
|---|---|---|
| 5,418,717 A | 5/1995 | Su et al. |
| 5,426,583 A | 6/1995 | Uribe-Echebarria Diaz De Mendibi |
| 5,475,587 A | 12/1995 | Anick et al. |
| 5,477,451 A | 12/1995 | Brown et al. |
| 5,490,061 A | 2/1996 | Tolin et al. |
| 5,497,319 A | 3/1996 | Chong et al. |
| 5,510,981 A | 4/1996 | Berger et al. |
| 5,550,934 A | 8/1996 | Van Vliembergen et al. |
| 5,559,693 A | 9/1996 | Anick et al. |
| 5,669,007 A | 9/1997 | Tateishi |
| 5,677,835 A | 10/1997 | Carbonell et al. |
| 5,678,051 A | 10/1997 | Aoyama |
| 5,687,383 A | 11/1997 | Nakayama et al. |
| 5,696,980 A | 12/1997 | Brew |
| 5,715,468 A | 2/1998 | Budzinski |
| 5,721,938 A | 2/1998 | Stuckey |
| 5,724,593 A | 3/1998 | Hargrave et al. |
| 5,729,741 A | 3/1998 | Liaguno et al. |
| 5,737,617 A | 4/1998 | Bernth et al. |
| 5,752,051 A | 5/1998 | Cohen |
| 5,768,603 A | 6/1998 | Brown et al. |
| 5,784,489 A | 7/1998 | Van Vliembergen et al. |
| 5,787,410 A | 7/1998 | McMahon |
| 5,794,050 A | 8/1998 | Dahlgren et al. |
| 5,794,177 A | 8/1998 | Carus et al. |
| 5,826,219 A | 10/1998 | Kutsumi |
| 5,826,220 A | 10/1998 | Takeda et al. |
| 5,848,385 A | 12/1998 | Poznanski et al. |
| 5,867,811 A | 2/1999 | O'Donoghue |
| 5,873,056 A | 2/1999 | Liddy et al. |
| 5,884,247 A | 3/1999 | Christy |
| 5,995,920 A | 11/1999 | Carbonell et al. |
| 6,006,221 A | 12/1999 | Liddy et al. |
| 6,055,528 A | 4/2000 | Evans |
| 6,076,051 A | 6/2000 | Messerly et al. |
| 6,081,774 A | 6/2000 | De Hita et al. |
| 6,161,083 A | 12/2000 | Franz et al. |
| 6,182,028 B1 | 1/2001 | Karaali et al. |
| 6,223,150 B1 | 4/2001 | Duan et al. |
| 6,233,544 B1 | 5/2001 | Alshawi |
| 6,233,546 B1 | 5/2001 | Datig |
| 6,243,669 B1 | 6/2001 | Horiguchi |
| 6,243,670 B1 | 6/2001 | Bessho et al. |
| 6,243,689 B1 | 6/2001 | Norton |
| 6,243,723 B1 | 6/2001 | Ikeda et al. |
| 6,246,977 B1 | 6/2001 | Messerly et al. |
| 6,260,008 B1 | 7/2001 | Sanfilippo |
| 6,266,642 B1 | 7/2001 | Franz et al. |
| 6,275,789 B1 | 8/2001 | Moser et al. |
| 6,278,967 B1 | 8/2001 | Akers et al. |
| 6,282,507 B1 | 8/2001 | Horiguchi et al. |
| 6,285,978 B1 | 9/2001 | Bernth et al. |
| 6,330,530 B1 | 12/2001 | Horiguchi et al. |
| 6,345,245 B1 | 2/2002 | Sugiyama et al. |
| 6,349,276 B1 | 2/2002 | McCarley et al. |
| 6,356,864 B1 | 3/2002 | Foltz et al. |
| 6,356,865 B1 | 3/2002 | Franz et al. |
| 6,381,598 B1 | 4/2002 | Williamowski et al. |
| 6,393,389 B1 | 5/2002 | Chanod et al. |
| 6,442,524 B1 | 8/2002 | Ecker et al. |
| 6,463,404 B1 | 10/2002 | Appleby |
| 6,470,306 B1 | 10/2002 | Pringle et al. |
| 6,523,026 B1 | 2/2003 | Gillis et al. |
| 6,529,865 B1 | 3/2003 | Duan et al. |
| 6,601,026 B2 | 7/2003 | Appelt et al. |
| 6,604,101 B1 | 8/2003 | Chan et al. |
| 6,622,123 B1 | 9/2003 | Chanod et al. |
| 6,658,627 B1 | 12/2003 | Gallup et al. |
| 6,721,697 B1 * | 4/2004 | Duan ............... G06F 17/277 704/2 |
| 6,760,695 B1 | 7/2004 | Kuno et al. |
| 6,778,949 B2 | 8/2004 | Duan et al. |
| 6,871,174 B1 | 3/2005 | Dolan et al. |
| 6,871,199 B1 | 3/2005 | Binnig et al. |
| 6,901,399 B1 | 5/2005 | Corston et al. |
| 6,901,402 B1 | 5/2005 | Corston-Oliver et al. |
| 6,928,407 B2 | 8/2005 | Ponceleon et al. |
| 6,928,448 B1 | 8/2005 | Franz et al. |
| 6,937,974 B1 | 8/2005 | D'Agostini |
| 6,947,923 B2 | 9/2005 | Cha et al. |
| 6,965,857 B1 | 11/2005 | Decary |
| 6,983,240 B2 | 1/2006 | Ait-Mokhtar et al. |
| 6,986,104 B2 | 1/2006 | Green et al. |
| 7,013,264 B2 | 3/2006 | Dolan et al. |
| 7,020,601 B1 | 3/2006 | Hummel et al. |
| 7,027,974 B1 | 4/2006 | Busch et al. |
| 7,050,964 B2 | 5/2006 | Menzes et al. |
| 7,085,708 B2 | 8/2006 | Manson et al. |
| 7,132,445 B2 | 11/2006 | Taveras et al. |
| 7,146,358 B1 | 12/2006 | Gravano et al. |
| 7,167,824 B2 | 1/2007 | Kallulli |
| 7,191,115 B2 | 3/2007 | Moore |
| 7,200,550 B2 | 4/2007 | Menezes et al. |
| 7,263,488 B2 | 8/2007 | Chu et al. |
| 7,269,594 B2 | 9/2007 | Corston-Oliver et al. |
| 7,346,493 B2 | 3/2008 | Ringger et al. |
| 7,356,457 B2 | 4/2008 | Pinkham et al. |
| 7,409,404 B2 | 8/2008 | Gates |
| 7,461,056 B2 | 12/2008 | Cao et al. |
| 7,466,334 B1 | 12/2008 | Baba et al. |
| 7,475,015 B2 | 1/2009 | Epstein et al. |
| 7,577,683 B2 | 8/2009 | Cho et al. |
| 7,619,656 B2 | 11/2009 | Ben-Ezra et al. |
| 7,668,791 B2 | 2/2010 | Azzam et al. |
| 7,672,830 B2 | 3/2010 | Goutte et al. |
| 7,672,831 B2 | 3/2010 | Todhunter et al. |
| 7,739,102 B2 | 6/2010 | Bender |
| 7,769,579 B2 | 8/2010 | Zhao et al. |
| 8,065,290 B2 | 11/2011 | Hogue et al. |
| 8,073,865 B2 | 12/2011 | Davis et al. |
| 8,078,450 B2 | 12/2011 | Anisimovich et al. |
| 8,145,473 B2 | 3/2012 | Anisimovich et al. |
| 8,176,048 B2 | 5/2012 | Morgan et al. |
| 8,214,199 B2 | 7/2012 | Anismovich et al. |
| 8,229,730 B2 | 7/2012 | Van Den Berg et al. |
| 8,229,944 B2 | 7/2012 | Latzina et al. |
| 8,234,106 B2 * | 7/2012 | Marcu ............... G06F 17/2735 704/10 |
| 8,260,049 B2 | 9/2012 | Deryagin et al. |
| 8,266,077 B2 | 9/2012 | Handley |
| 8,271,453 B1 | 9/2012 | Pasca et al. |
| 8,285,728 B1 | 10/2012 | Rubin |
| 8,300,949 B2 | 10/2012 | Xu |
| 8,301,633 B2 | 10/2012 | Cheslow |
| 8,370,128 B2 | 2/2013 | Brun et al. |
| 8,402,036 B2 | 3/2013 | Blair-Goldensohn et al. |
| 8,423,495 B1 | 4/2013 | Komissarchik et al. |
| 8,468,153 B2 | 6/2013 | Ahlberg et al. |
| 8,495,042 B2 | 7/2013 | Symington et al. |
| 8,533,188 B2 | 9/2013 | Yan et al. |
| 8,548,951 B2 | 10/2013 | Solmer et al. |
| 8,554,558 B2 | 10/2013 | McCarley et al. |
| 8,577,907 B1 | 11/2013 | Singhal et al. |
| 8,856,096 B2 | 10/2014 | Marchisio et al. |
| 2001/0014902 A1 | 8/2001 | Hu et al. |
| 2001/0029442 A1 | 10/2001 | Shiotsu et al. |
| 2001/0029455 A1 | 10/2001 | Chin et al. |
| 2002/0040292 A1 | 4/2002 | Marcu |
| 2002/0152246 A1 * | 10/2002 | Critchlow ........... G06F 17/2863 715/262 |
| 2003/0145285 A1 | 7/2003 | Miyahira et al. |
| 2003/0158723 A1 | 8/2003 | Masuichi et al. |
| 2003/0176999 A1 | 9/2003 | Calcagno et al. |
| 2003/0182102 A1 | 9/2003 | Corston-Oliver et al. |
| 2003/0204392 A1 | 10/2003 | Finnigan et al. |
| 2004/0034520 A1 | 2/2004 | Langkilde-Geary et al. |
| 2004/0064438 A1 | 4/2004 | Kostoff |
| 2004/0098247 A1 | 5/2004 | Moore |
| 2004/0122656 A1 | 6/2004 | Abir |
| 2004/0172235 A1 | 9/2004 | Pinkham et al. |
| 2004/0193401 A1 | 9/2004 | Ringger et al. |
| 2004/0254781 A1 | 12/2004 | Appleby |
| 2004/0261016 A1 | 12/2004 | Glass et al. |

(56) References Cited

U.S. PATENT DOCUMENTS

| | | |
|---|---|---|
| 2005/0010421 A1 | 1/2005 | Watanabe et al. |
| 2005/0015240 A1 | 1/2005 | Appleby |
| 2005/0080613 A1 | 4/2005 | Colledge et al. |
| 2005/0086047 A1 | 4/2005 | Uchimoto et al. |
| 2005/0108630 A1 | 5/2005 | Wasson et al. |
| 2005/0137853 A1 | 6/2005 | Appleby et al. |
| 2005/0155017 A1 | 7/2005 | Berstis et al. |
| 2005/0171757 A1 | 8/2005 | Appleby |
| 2005/0209844 A1 | 9/2005 | Wu et al. |
| 2005/0240392 A1 | 10/2005 | Munro, Jr. et al. |
| 2006/0004563 A1 | 1/2006 | Campbell et al. |
| 2006/0004653 A1 | 1/2006 | Strongin |
| 2006/0080079 A1 | 4/2006 | Yamabana |
| 2006/0095248 A1* | 5/2006 | Menezes ............ G06F 17/2818 704/3 |
| 2006/0095250 A1 | 5/2006 | Chen et al. |
| 2006/0217964 A1 | 9/2006 | Kamatani et al. |
| 2006/0224378 A1 | 10/2006 | Chino et al. |
| 2006/0293876 A1 | 12/2006 | Kamatani et al. |
| 2007/0010990 A1 | 1/2007 | Woo |
| 2007/0016398 A1 | 1/2007 | Buchholz |
| 2007/0083359 A1 | 4/2007 | Bender |
| 2007/0083505 A1 | 4/2007 | Ferrari et al. |
| 2007/0094006 A1 | 4/2007 | Todhunter et al. |
| 2007/0100601 A1 | 5/2007 | Kimura |
| 2007/0150800 A1 | 6/2007 | Betz et al. |
| 2007/0203688 A1 | 8/2007 | Fuji et al. |
| 2007/0250305 A1 | 10/2007 | Maxwell |
| 2008/0086300 A1* | 4/2008 | Anismovich ........... G06F 17/28 704/9 |
| 2008/0091405 A1* | 4/2008 | Anisimovich ...... G06F 17/2755 704/4 |
| 2008/0133218 A1 | 6/2008 | Zhou et al. |
| 2008/0228464 A1 | 9/2008 | Al-Onaizan et al. |
| 2008/0319947 A1 | 12/2008 | Latzina et al. |
| 2009/0063472 A1 | 3/2009 | Pell et al. |
| 2009/0070094 A1 | 3/2009 | Best et al. |
| 2009/0182549 A1* | 7/2009 | Anisimovich ...... G06F 17/2755 704/4 |
| 2010/0082324 A1 | 4/2010 | Itagaki et al. |
| 2011/0055188 A1 | 3/2011 | Gras |
| 2011/0072021 A1 | 3/2011 | Lu et al. |
| 2011/0191286 A1 | 8/2011 | Cho et al. |
| 2011/0258181 A1 | 10/2011 | Brdiczka et al. |
| 2011/0295864 A1 | 12/2011 | Betz et al. |
| 2011/0301941 A1 | 12/2011 | De Vocht |
| 2011/0307435 A1 | 12/2011 | Overell et al. |
| 2012/0023104 A1 | 1/2012 | Johnson et al. |
| 2012/0030226 A1 | 2/2012 | Holt et al. |
| 2012/0123766 A1* | 5/2012 | Anisimovich ........ G06F 17/289 704/3 |
| 2012/0131060 A1 | 5/2012 | Heidasch et al. |
| 2012/0197628 A1 | 8/2012 | Best et al. |
| 2012/0197885 A1 | 8/2012 | Patterson |
| 2012/0203777 A1 | 8/2012 | Laroco, Jr. et al. |
| 2012/0221553 A1 | 8/2012 | Wittmer et al. |
| 2012/0246153 A1 | 9/2012 | Pehle |
| 2012/0296897 A1 | 11/2012 | Xin-Jing et al. |
| 2012/0310627 A1 | 12/2012 | Qi et al. |
| 2013/0013291 A1 | 1/2013 | Bullock et al. |
| 2013/0054589 A1 | 2/2013 | Cheslow |
| 2013/0091113 A1 | 4/2013 | Gras |
| 2013/0132383 A1 | 5/2013 | Ahlberg et al. |
| 2013/0138696 A1 | 5/2013 | Turdakov et al. |
| 2013/0144592 A1 | 6/2013 | Och et al. |
| 2013/0144594 A1 | 6/2013 | Bangalore et al. |
| 2013/0185307 A1 | 7/2013 | El-Yaniv et al. |
| 2013/0254209 A1 | 9/2013 | Kang et al. |
| 2013/0282703 A1 | 10/2013 | Puterman-Sobe et al. |
| 2013/0311487 A1 | 11/2013 | Moore et al. |
| 2013/0318095 A1 | 11/2013 | Harold |
| 2014/0012842 A1 | 1/2014 | Yan et al. |

OTHER PUBLICATIONS

Hutchins, "Machine Translation: past, present, future", (Ellis Horwood Series in Computers and their Applications) Ellis Horwood: Chichester, 1986, 382 pp. ISBN 0-85312-788-3, $49.95 (hb).

Mitamura, et al., "An Efficient Interlingua Translation System for Multi-Lingual Document Production", http://citeseerx.ist.psu.edu/viewdoc/summary?doi=10.1.1.44.5702, Jul. 1, 1991.

* cited by examiner

Fig.5

ARC FILTERING IN A SYNTACTIC GRAPH

CROSS REFERENCE TO RELATED APPLICATIONS

This application claims the benefit of priority under 35 USC 119 to Russian Patent Application No. 2014101124, filed Jan. 15, 2014; the disclosure of which is incorporated herein by reference.

FIELD OF THE INVENTION

The present invention is related to computer-implemented analysis of syntactic structure of a text.

PRIOR ART

There exist multiple systems for natural language processing of written texts in human languages. Since there is substantial ambiguity in structure of a human language, such texts are not easy to analyze. The number of potential syntactic links in a sentence may be very large.

As a result there are a large number of potential syntactic constructions that can be considered when analyzing a text. The more expanded the analysis system is and the more possibilities it considers, the more variants have to be analyzed. An attempt to analyze all the links will lead to a combinatorial explosion. An attempt to look at only the most probable combinations may lead to a loss of meaning. As a result, the problem of optimizing the process of syntactic analysis to minimize required time while maintaining integrity of the result is crucial. The present invention is offering a method of evaluating all possible syntactic combination quickly and without losing true meaning of the text.

SUMMARY OF THE INVENTION

This document discloses methods, techniques, and systems for analyzing a source sentence by identifying a sentence, identifying a graph of generalized constituents for the sentence based on rough syntactic analysis of the lexical-morphological structure of the sentence, where the graph of generalized constituents comprises arcs and nodes; filtering the arcs of the graph of generalized constituents using a combination classifier. In some implementations the combination classifier comprises a tree classifier and at least one linear classifier; and identifying a syntactic structure of the source sentence by performing precise syntactic analysis based on the graph of generalized constituents with the filtered arcs.

In some implementations, the tree classifier divides the arcs into clusters based on a predetermined set of features. In further implementations, the predetermined set of featured is based on parallel analysis of a two-language text corpus. In further implementations, the order of the features from the predetermined set of features is determined based on entropy measures of the features. In some implementations, the tree classifier is based on Iterative Dichotomiser 3 (ID3) algorithm. In some implementations, weights for the linear classifier are based on parallel analysis of a two-language untagged text corpus.

This document also discloses methods, techniques, and systems for classifier training including performing parallel analysis of a two-language text corpus, identifying two parallel sentences from the untagged two-language text corpus; preparing two corresponding graphs of generalized constituents for each of the two parallel sentences; generating at least one syntactic tree based on the graphs of generalized constituents for the two parallel sentences, where an arc of the graph of generalized constituents is included in the syntactic tree based on whether the second corresponding graph of generalized constituents comprises a matching arc; and training a combination classifier based on the generated syntactic tree.

BRIEF DESCRIPTION OF THE DRAWINGS

Additional purposes, characteristics, and advantages of this invention will be disclosed in the following description of the embodiment of the invention with reference to the attached drawings, in which.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one implementation" or "an implementation" means that a particular feature, structure, or characteristic described in connection with the implementation is included in at least one implementation of the invention. The appearances of the phrase "in one implementation" in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not other implementations.

Figure 1:
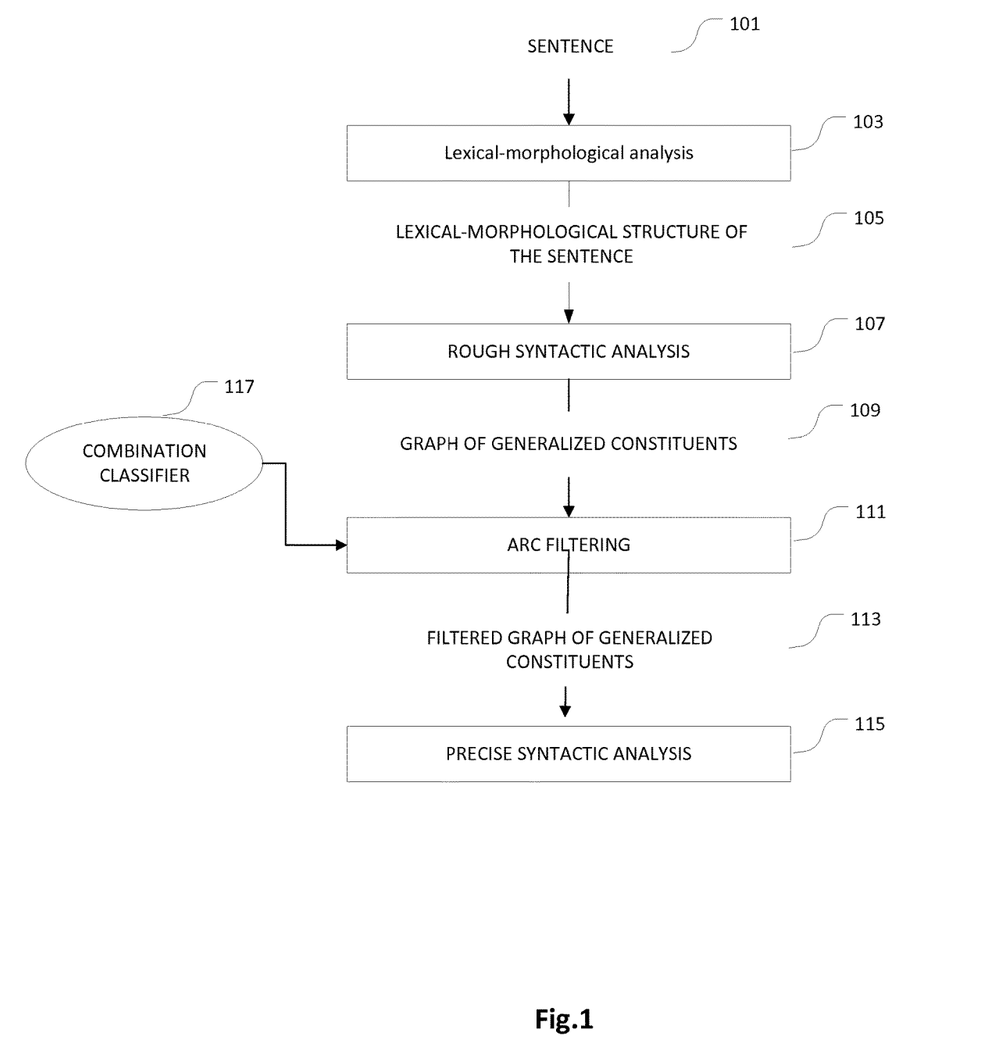
FIG. 1 shows a block diagram illustrating process of syntactic structure analysis.

FIG. 1 illustrates a method of performing syntactic analysis of a sentence according to aspects of the disclosure. First, the system identifies a sentence 101 to be analyzed. Then the system performs a lexical-morphological analysis 103 of the sentence 101 detecting a lexical-morphological structure 105 of the sentence 101. Subsequently, the system performs a rough syntactic analysis 107 of the sentence 101 using the detected lexical-morphological structure 105. During rough syntactic analysis 107 of the sentence 101, the system builds a graph of generalized constituents 109 for the sentence 101.

A graph of generalized constituents of a sentence is a representation of all possible relationships between words in the sentence. Nodes of the graph represent constituents of the sentence. A constituent is a word or a group of words that functions as a single unit within a hierarchical structure. Each constituent in the sentence is represented in the graph of generalized constituents by a node. Generalized, for example, by a part of speech, nodes may represent many variants of lexical and grammatical values of words they represent. The arcs between the nodes represent surface (syntactic) slots expressing various types of relationships between the lexical values. Constituent has a core represented by word with its morphological meaning and semantic ancestor (semantic class), and can have child constituent of a lower level.

The graph of generalized constituents 109 is build from the lexical-morphological structure 105 of the sentence 101. All the possible surface syntactic models for each element of lexical-morphological structure 105 are applied, and all the possible constituents are built and generalized. A rough syntactic analyzer or its equivalents is adapted to generate the graph of the generalized constituents 109 from the lexical-morphological structure 105 using surface models, deep models, and a lexical-semantic dictionary.

In one implementation, all the possible syntactic descriptions and syntactic structures for the sentence 101 are considered and generalized. As a result, the graph of the generalized constituents 109 is built, having each constituent generalized from all the possible constituents for each element of the sentence 101, and building generalized constituents are performed for all the elements of the sentence 101. The graph of generalized constituents 109 reflects, on a surface model level, all hypothetical possible syntactic relationships between the words of the sentence 101.

To build all possible constituents, every element of the source sentence 101 which is not a space or a punctuator is viewed as a potential core of a constituent. The building of the graph of generalized constituents 109 starts with building those constituents which have only the core word form and further expands to build constituents of the next level by including neighboring constituents. For each pair of "lexical meaning-grammatical value" which corresponds to a non-trivial arc of lexical-morphological structure, its surface model is initialized, attempting to attach other constituents in the surface slots of the syntforms of its surface model to the right and the left neighboring constituents. If an appropriate syntform is found in the surface model of the corresponding lexical meaning, the selected lexical meaning may be the core of a new constituent.

The graph of generalized constituents 109 is first built as a tree, from the leaves to the root (bottom up). Building of additional constituents is performed bottom-up by attaching child constituents to parent constituents via filling the surface slots of parent constituents to cover all the initial lexical units of the sentence 101.

The root of the tree is the main clause, represented by a special constituent corresponding to various types of maximal units of a text analysis (complete sentences, enumerations, titles, etc.). The core of the main clause is generally a predicate. During this process, the tree actually becomes a graph, because lower-level constituents (the leaves) can be included into different upper-level constituents (the root).

Some of the constituents which are built for the same element of the lexical-morphological structure may be generalized to obtain generalized constituents. Constituents are generalized by the lexical meanings, by the grammatical values, for example, by parts of speech, by their boundaries, among others. Constituents are generalized by the boundaries, since there may be very different syntactic relationships in the sentence, and the same word may be included in different constituents. As a result of the rough syntactic analysis 107, the graph 109 of generalized constituents is built which represents the sentence 101.

Figure 2:
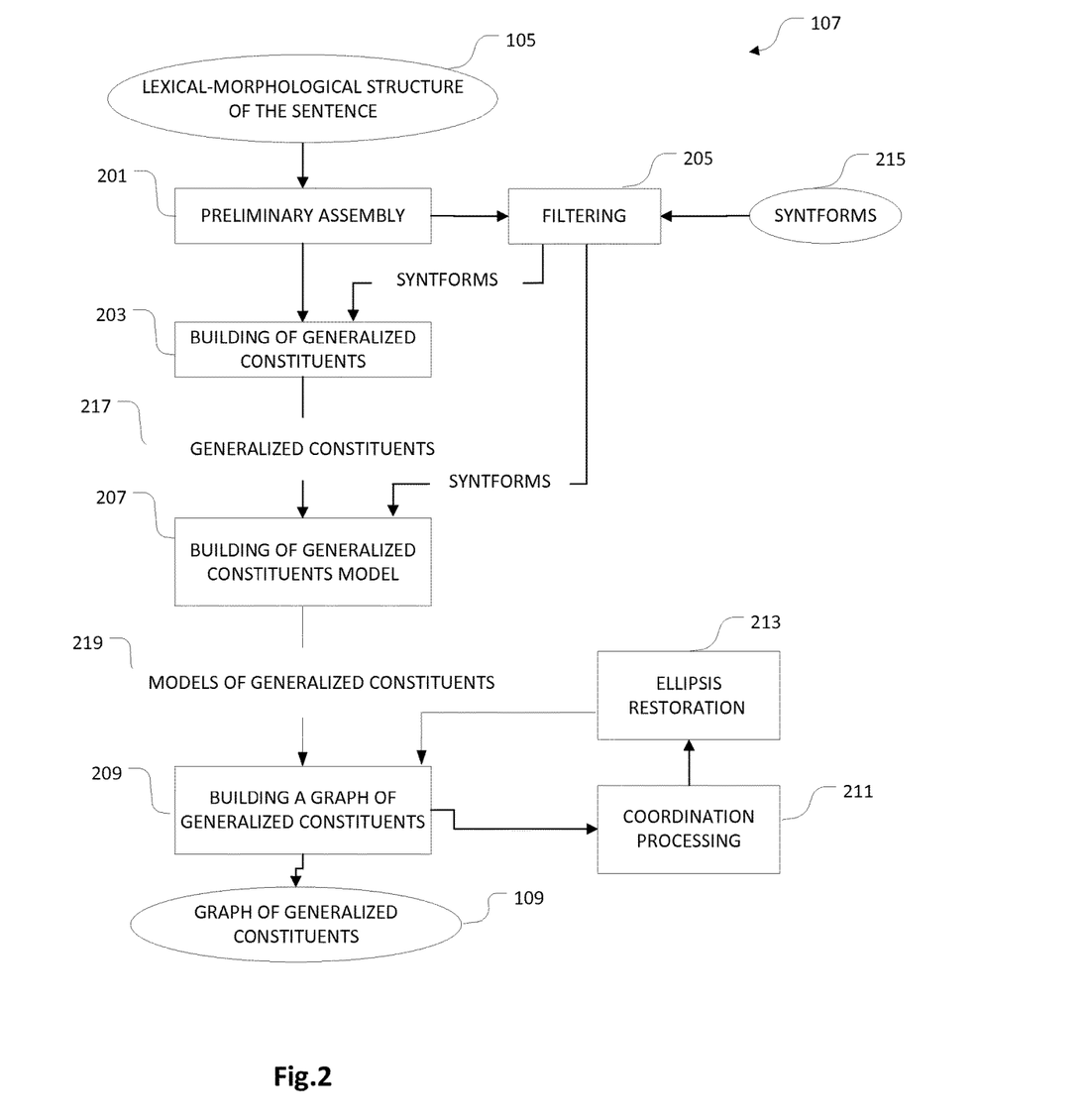
FIG. 2 shows a block diagram illustrating process of rough syntactic analysis.

FIG. 2 illustrates in further detail the rough syntactic analysis 107 according to one or more embodiments of the invention. The rough syntactic analysis 107 generally includes preliminary assembly 201 of the constituents, building of generalized constituents 203, filtering 205, building of generalized constituent models 207, building a graph of generalized constituents 209, coordination processing 211, and restoring ellipsis 213, among others.

The preliminary assembly 201 of the constituents during the rough syntactic analysis 107 is performed on the lexical-morphological structure 105 of the sentence to be analyzed, including certain word groups, the words in brackets, inverted commas, etc. Only one word in the group (the constituent core) can attach or be attached to constituents outside the group. The preliminary assembly 201 is performed early during the rough syntactic analysis 107 before building of generalized constituents 203 and building of the generalized constituent models 207 to cover all the boundaries of the whole sentence.

Building of generalized constituents 203 generally require that all possible pairs of the lexical meaning and the grammatical value are found or assigned for each of the constituents and attach the surface slots of the child constituents thereof to each of the constituents. Lexical units of the sentence 101 can form into core constituents at bottom levels. Each constituent can be attached to a constituent at a higher level if the surface slots of the constituent at the higher level can be filled. Thus, the constituents are further expanded to include the neighboring constituents built at previous constituent building process until all of the possible constituents have been built to cover the entire sentence.

During rough syntactic analysis 107, the number of the different constituents which may be built and the syntactic relationships among them are considerably large, some of the surface models of the constituents are chosen to be filtered through the process of filtering 205 prior to and after the building the constituents in order to reduce the number of the different constituents to be considered.

The filtering 205 during the rough syntactic analysis 107 include filtering of a set of syntforms 215 performed prior to and during the building of generalized constituents 203. The syntforms 215 and the surface slots are filtered a priori, and constituents are filtered after they are built. The process of the filtering 205 distills out a number of syntforms 215 including, but not limited to, those syntforms that do not correspond to the grammatical values of the constituent, those syntforms where none of the core slots can be filled, those syntforms with special slots which describe grammatical movement, among others. A special slot, such as relativization and question, presupposing a special lexeme (relative or interrogative pronoun), is filtered out if the special lexeme is not present in the sentence.

In general, the syntax forms (syntforms 215) which do not have fillers for at least one surface slot can be filtered and discarded. In addition, those lexical meanings which do not have syntforms 215 with filled surface slots are filtered and discarded. The rough syntactic analysis 107 is impossible to succeed if there is no syntform and no filled surface slot, and as such the filtering 205 is performed.

Once all possible constituents are built, the generalization procedure is performed for building of the generalized constituents 207. All possible homonyms and all possible meanings for elements of the source sentence which are capable of being present in the same part of a speech are condensed and generalized, and all possible constituents built in this fashion are condensed into generalized constituents 217.

A generalized constituent 217 describes all the constituents with all the possible boundaries in a given source sentence which have a word form as the core constituent and various lexical meanings of this word form. Since the constituents are generalized, a single constituent for each lexical meaning corresponding to each entity of a sentence, including homonyms, is built, and their syntactic forms may be analyzed simultaneously.

The building of generalized constituent models 207 is performed and a set of models of generalized constituents 219 having generalized models of all generalized lexemes are built. A generalized constituent model of a lexeme contains a generalized deep model and a generalized surface model. A generalized deep model of a lexeme includes the list of all of the deep slots which have the same lexical meaning for a lexeme, together with the descriptions of all the requirements for the fillers of the deep slots. A generalized surface model contains information about the syntforms 215, where the lexeme may occur, about the surface slots, about the diatheses correspondences between surface slots and deep slots, and about the linear order description.

The syntforms 215 and the surface slots that are significant for this lexeme are selected with the help of the bit-mask. In addition, models of the generalized constituents are built because a constituent is generalized not only by lexical meanings and syntactic forms of its core, but also by the fragments it fills. The use of the models of the generalized constituents reduces the number of wrong relationships and helps to optimize the process to extract a syntactic tree so that all possible boundaries are considered.

As shown in FIG. 2, information from the syntforms 215 of the syntactic descriptions as well as the semantic descriptions are used to build the models of the generalized constituents 219. For example, dependent constituents are attached to each lexical meaning of a sentence unit and the rough syntactic analysis 107 may also need to determine whether a "candidate" constituent as a dependent constituent can be a filler of the corresponding deep slot of the deep model for a core constituent. Such compatibility analysis allows the wrong syntactic relationships to be discarded early.

The building of the graph of the generalized constituents 209 is performed. The graph of generalized constituents 109 which describes all possible syntactic structures of the entire sentence is built by linking and assembling the generalized constituents 217 to each other. The building of the graph of the generalized constituents 209 is organized via generating and processing of the queue of requests to attach one constituent to another constituent. In general, contact pairs of constituents representing contact groups of words in the sentence can be included in the request queue.

Figure 3:
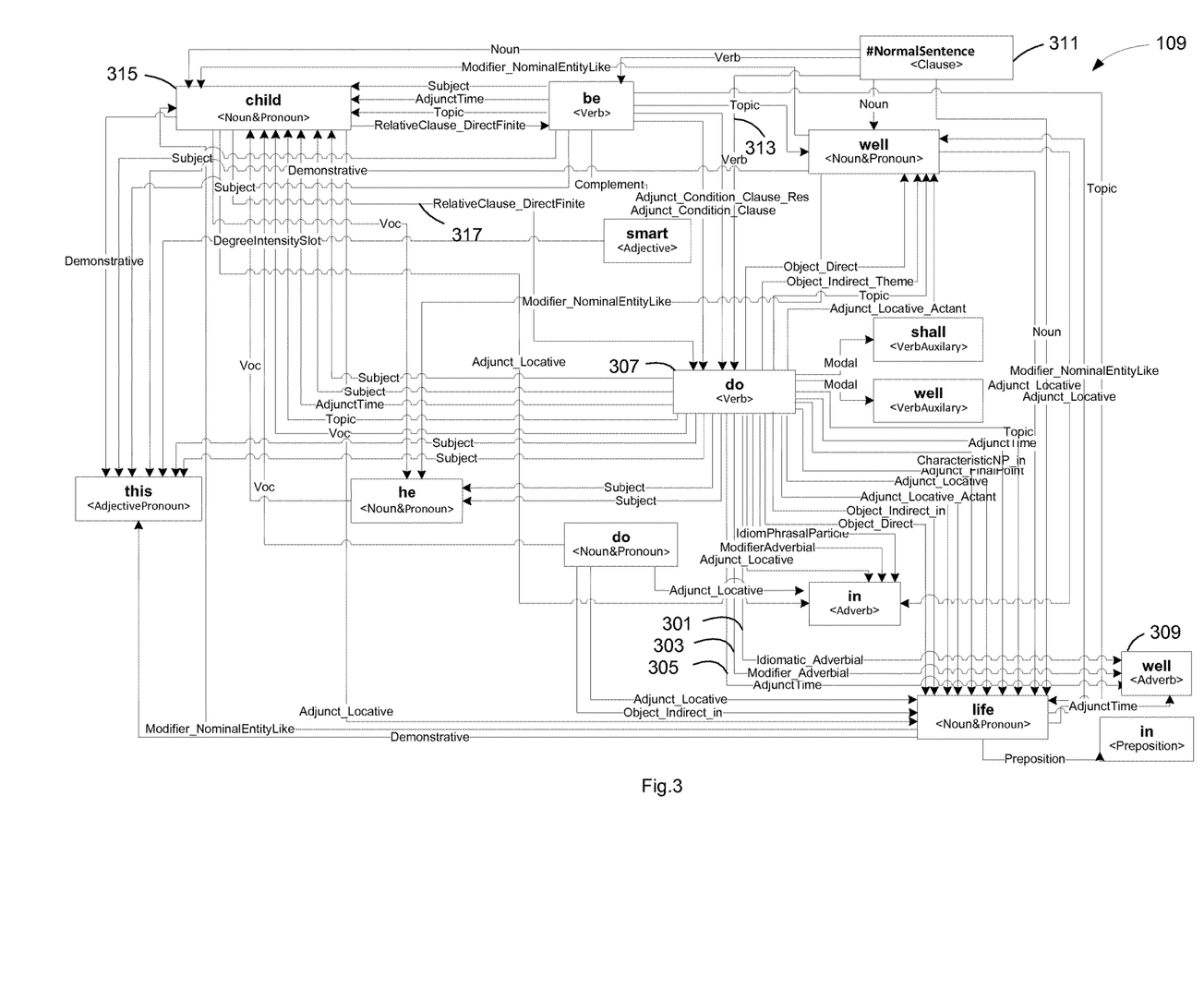
FIG. 3 shows a schematic representation of a graph of generalized constituents.

FIG. 3 is an example of a graph of generalized constituents 109 for the sentence "This boy is smart, he'll do well in life." The constituents are represented by rectangles, each constituent having a lexeme as its core. Morphological paradigm (as a rule, the part of speech) of a constituent core is expressed by grammemes of the part of speech and displayed in broken brackets below the lexeme. A morphological paradigm as a part of word-inflection description of morphological description contains all information about word-inflection of one or more part of speech. For example, since "do" can have two parts of speech: <Verb> and <Noun> (which is represented by the generalized morphological paradigm <Noun&Pronoun>), two constituents for "do" are shown in the graph 109.

Links in the graph 109 represent filled surface slots of constituent cores. Slot names are displayed on the arrows of the graph. Any constituent is formed by a lexeme-core which may have outgoing named arrows which denotes surface slots filled by child constituents. An incoming arrow means attaching this constituent to a surface slot of another constituent. The graph 109 is so complicated and has so many arrows, because it shows all relationships which can be established between constituents of the sentence "This boy is smart, he'll do well in life." Among them there are many relationships in the graph 109 which, however, will be discarded. A value of said rough rating is saved by each arrow denoting a filled surface slot. Surface slot and relationships with high rating scores are selected hierarchically during the next step of syntactic analysis.

Often several arrows may connect the same pairs of constituents. It means that there are different acceptable surface models for this pair of constituents, and several surface slots of the parent constituent may be independently filled by this child constituent. So, three surface slots named Idiomatic_Adverbial 301, Modifier_Adverbial 303 and AdjunctTime 305 of the parent constituent "do<Verb>" 307 may be independently filled by the child constituent "well<Adverb>" 309 in accordance with surface model of the constituent "do<Verb>". Thus, roughly speaking "do<Verb>" 307+"well<Adverb>" 309 form a new constituent with the core "do<Verb>" which is attached to another parent constituent, for example, to #NormalSentence<Clause> 311 in the surface slot Verb 313, and to "child<Noun&Pronoun>" 315 in the surface slot RelativClause_DirectFinite 317 The marked element #NormalSentence<Clause> 311, being the "root", corresponds to the whole sentence.

The process of rough syntactic analysis and lexical-morphological analysis are described, for example, in U.S. Pat. No. 8,078,450, <<Method and system for analyzing various languages and constructing language—independent semantic structures>> filed Oct. 10, 2006.

Returning to FIG. 1, the rough syntactic analysis 107 of the sentence 101 produces the graph of generalized constituents 109. Then, the resulting graph 109 is subjected to arc filtering 111 in order to substantially reduce the number of arcs in the graph 109. In some implementations, the filtered graph of generalized constituents 113 is then used to perform a precise syntactic analysis 115. The filtered graph 113 contains a substantially reduced number of arcs as compared to the graph 109 before filtering. The reduction of the number of arcs in the graph 109 results in increased productivity and quality of the precise syntactic analysis 113.

The arc filtering 111 of the graph of generalized constituents 109 is performed by a combination classifier 117.

A classifier is an algorithm performing classification of a set of items. Classification is a process of dividing a set of items into classes in some way.

Figure 4:
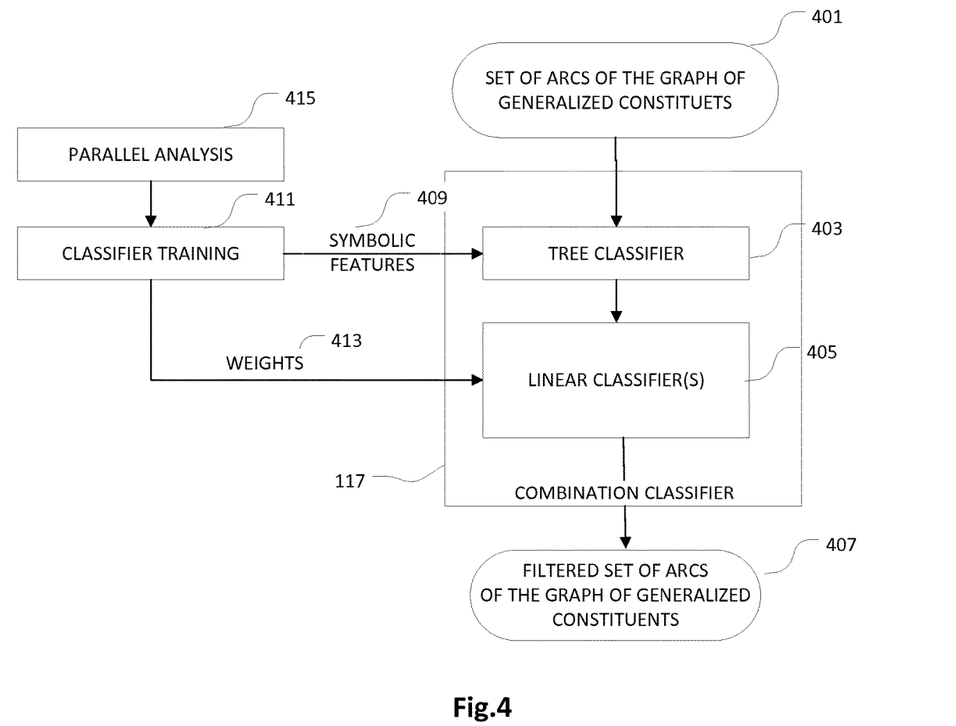
FIG. 4 shows a block diagram illustrating arc filtering.

In some implementations, the combination classifier 117 is a combination of a linear classifier and a tree classifier. The combination classifier 117 is organized as a decision tree with linear classifiers 405 at the nodes. The combination classifier 117 filters arcs using two types of features: symbolic and numerical.

Symbolic features are identifiers corresponding to elements of the description. In some implementations, the following list and combinations of features are used as symbolic features:

a surface slot, which is a type of syntactic description of a deep slot. For example, a surface slot could be an indication of the part of the sentence that is a word such as: subject, object, predicate, etc. or can play role of attributive, locative etc.

a length of a link (with a character count), which is a number of steps that one can use to get through the syntactic tree from one word to another, taking the punctuation into account;

syntparadigm which is a combination of syntactic forms that describe the surface implementation of a deep model for a given core.

In some implementations, the numerical features may include but are not limited to various a priori and statistical ratings, such as ratings of lexical meanings, ratings of fillers, punctuation ratings, or ratings of semantic descriptions.

As illustrated in FIG. 4, in some implementations, the combination classifier 117 obtains a set of arcs 401 of the graph of generalized constituents 109, classifies these arcs with a tree classifier 403 into clusters, then the linear classifier(s) 405 make decision about including these arcs into the graph of generalized constituents 407.

When filtration process is launched, the tree classifier 403 initially divides arcs into clusters using symbolic features 409 selected as primary features during a classifier training 411. The number of steps for clustering is determined by the number of symbolic features 409 selected during the classifier training 411 and the amount of data that satisfies them.

The tree classifier 403 uses a decision tree to classify the arcs of the graph of generalized constituents 401. Each node of the tree corresponds to one of the features of the set of symbolic features 409.

In some implementations, the order in which the symbolic features 409 are applied to the set of arcs is determined by an entropy (or information gain) of the corresponding features. During each iteration the classifier calculates entropy H(S) for every unused feature in the set of symbolic features 409, where S is the set of arcs of the graph of generalized constituents 401. H(S) should be understood as a measure of uncertainty of the information that we obtain from the set S based on each feature, and it selects the feature with the smallest entropy $H_{min}(S)$. This measure corresponds to the maximum information gain for this feature, that is, the difference in entropy before and after the set S is split in accordance with this feature. In other words, information gain shows how many uncertainties in S we remove, after splitting S in accordance with this feature. The feature with the smallest entropy (or largest information gain) is selected, and the set of arcs of the graph of generalized constituents 401 is split into two subsets such that the elements of one subset have the feature with $H_{min}(S)$ and those of the other set don't.

The algorithm of the tree classifier 403 continues recursively on each subset, only looking at those elements not previously chosen. Recursion on a subset may stop in one of the following cases:

each element of the subset belongs to one of the clusters (+ or −);

there are no more features to be selected, but the examples still do not belong to the same class (some are + and some are −), then the node is turned into a leaf and labeled with the most common class of the examples in the subset;

there are no examples in the subset corresponding to the feature chosen at this step. Then a leaf is created, and labeled with the most common class of the examples in the parent set.

The algorithm used by the tree classifier includes the following main steps:

computing the entropy for each feature of the data set S;

splitting set S into subsets based on the feature with the minimum entropy (or, in other words, with the maximum information gain);

creating nodes for the decision tree that contain each feature;

recursion by subsets using the remaining features.

The algorithm can return an excessive number of features. In order to avoid that, a limitation is set on the size of the tree. It is more effective to create smaller trees than larger ones. When this is done, the method frequently leads to construction of small trees, but not the smallest possible ones.

Entropy H(S) is a measurement of the uncertainty in a set S. $H(S)=-\Sigma_{x \in X} p(x)\log_2 p(x)$ where S is the current set for which entropy is computed at each iteration of the algorithm; x is the selection of classes in set S, and p(x) is the ratio between the number of elements in class x and the number of elements in set S.

When H(S)=0, set S is ideally classified in the sense that all elements of S belong to a single class.

The information gain IG(i) is a measure of the reduction of uncertainty in set S after it split according to the feature i.

$IG(i)=H(S)-\Sigma_{t \in T}p(t)H(t)$, where H(S) is the entropy of selection S, T is the subset produced by breaking down S based on feature i, $S=U_{t \in T}t$; p(t) is the ratio of the number of elements in t to the number of elements in S, and H(t) is the entropy of subset t.

In one implementation, the features in the tree classifier 403 are ordered. In some implementations the tree classifier 403 is based on an Iterative Dichotomiser 3 (ID3) algorithm, CART algorithm, or a C4.5 algorithm.

In some implementations, the combination classifier 117 comprises a linear classifier 405. In other implementations the combination classifier 117 comprises two or more linear classifiers 405.

A linear classifier is a classifier that makes a classifying decision based on a linear combination of characteristics of the items being classified. The characteristics of an item are usually represented as a vector. If a characteristic vector $\vec{x}$ is entered into the classifier, the output rating looks like $y=f(\vec{w},\vec{x})=f(\Sigma_j w_j x_j)$ where $\vec{w}$ is the weighting vector and f is the function that transfers the scalar multiplication of vectors to the desired output value. The weighting vector $\vec{w}$ or a set of weights are computed while the classifier is being trained using marked training examples. Usually f is a simple function that puts all of the values larger than some threshold in the first class and all the rest in the second. More complex functions might, for example, provide the probability that an element belongs to a specific class. For tasks with a distribution between two classes, one can interpret the work of a linear classifier as a breakdown of a multi-dimensional space of input data using a hyperplane. All of the points on one side of the plane are classified as "yes" and the others as "no".

In some implementations, the linear classifier 405 receives as an input a set of arcs in a graph of generalized constituents 401 of the sentence 101, which are first clustered using the tree classifier 403. The linear classifier 405 makes a decision for each cluster about whether the cluster of arcs is "good" or "bad." The linear classier 405 makes this decision about a cluster by calculating an output rating for the cluster based on individual characteristics of the cluster being analyzed and a vector of weights 413 of the classifier, which is provided to the combination classifier 117 and the linear classifier 405 through classifier training 411.

After decisions for all clusters have been reached, the linear classifier 405 combines the decisions made for each cluster and finally applies a Bayesian formula to the decisions. The probabilities that arcs will fall into clusters of "good" and "bad" arcs are compared. These probabilities are computed based on an assumption of a normal distribution of projections of arcs in the space of numerical features onto a surface normal to a dividing plane. The projection onto a surface normal is computed as $$x = X*W/|W|,$$

where X is the vector for numerical features of links, and W is the weight vector in the classifier.

The probability that links fall into the clusters of "good" and "bad" links can be computed using the following formula:

$$P\text{good} = p(x)\text{good}/(p(x)\text{good} + p(x)\text{bad}),$$

where p(x) is the probability density for the normal distribution.

For each combination of symbolic features of arcs, we know the percentage of "good" arcs. So the full probability that an arc is "good" is calculated as $$P\text{good} = P\text{good}(\text{symb}) * P\text{good}(x).$$

The symbolic features 409 for the tree classifier 403 and the weights 413 for the linear classifier 405 are determined by classifier training 411. In some implementations, the classifier training is performed by parallel analysis 415 of a two-language text corpus.

The two-language text corpus is an untagged text corpus in two languages, such as Russian and English, where each sentence in one language has a corresponding sentence is the second language, with one sentence being an accurate translation of the other.

During parallel training 415, two corresponding sentences in both languages are first parsed, i.e. for each sentence graphs of generalized constituents are constructed. Then the system compares the two graphs of generalized constituents of corresponding sentences, and generates a tree with arcs from the two graphs. Only the arcs having the best matches in terms of semantic classes between the two graphs are selected for the tree. For example, if one graph has a link " показать файл " in which the lexeme " показать " belongs to the semantic class "TO SHOW" and the lexeme " файл " belongs to the class "FILE", while in the other graph there is an equivalent link "show file" for which "show" belongs to the class "TO SHOW" and "file" is from the class "FILE", this link is considered "good". If, for example, for "show file" from the second graph, the lexeme "show" is a noun and belongs to the class "PERFORMANCE" and the lexeme "file" is a verb from the class "TO FILE", this link is "bad". Since the corpus used in the analysis is untagged, i.e., the translator did not indicate "good" or "bad" arcs manually, in the general case we can construct more than one such tree structures for each pair of graphs corresponding to a pair of sentences. As a result of the parallel analysis 411, based on the pairs of graphs of generalized constituents, the system generates tree structures containing only "good" arcs.

Based on the parallel analysis 415 of the two-language text corpus, the system performs classifier training 411 to teach the classifier 117 to determine whether an arc from the set of arcs of the graph of generalized constituents 401 is "good" or "bad". Training is based on the principle of comparing a graph of generalized constituents with at least one tree structure produced using parallel analysis 415. Input graph has all possible syntactic arcs. Then all the arcs on this graph that are also present in at least one syntactic tree, created by parallel analysis 415, are marked "good" and the arcs that are absent from the syntactic trees are marked "bad". The output graph is a graph with marked arcs. During training, the classifier not only learns to distinguish "good" arcs from "bad" ones, it also forms a set of symbolic features 409 which will be used by the tree classifier 403.

The linear classifiers 405 on nodes of a decision tree of the combination classifier 117 can be trained by a variety of methods. In some implementations, these methods include a method of minimizing an error function or an SVM method.

Processing Grammatical Homonymy

In some implementation the combination classifier 117 is used to alleviate a homonyms problem. If there are multiple grammatical homonyms at one of the nodes of the graph of generalized constituents 109, their probabilities are calculated based on the proportional frequency in N-grams, which in this context must be understood as a sequence of words or a context:

$$p_1 = \exp(Q_1)/[\exp(Q_1) + \exp(Q_2)]$$

$$p_2 = \exp(Q_2)/[\exp(Q_1) + \exp(Q_2)]$$

The selection of a path in the syntactic tree is complicated by grammatical homonymy and the ambiguity of ellipsis templates. Therefore the final decision is made as follows:

For each path in the tree, the probability that the path will lead into a "good: or "bad" cluster is calculated, and then subsequently the full probability that the path will lead into a "good" or "bad" cluster is calculated.

$$P_{good} = \Sigma_{path} P_{path} * P_{good}(\text{symb}) * P_{good}(x)$$

$$P_{bad} = \Sigma_{path} P_{path} * P_{bad}(\text{symb}) * P_{bad}(x)$$

If the probability of the path leading into a "bad" cluster is higher than the probability of the path leading into a "good" cluster by a factor of N (1000-10000), the link is cut, but otherwise it remains:

$$P_{bad} < > P_{good} * N$$

The programs used to accomplish the methods corresponding to this disclosure may be a part of an operating system or may be a specialized application, component, program, dynamic library, module, script or a combination thereof.

This description shows the basic inventive concept of the inventors, which cannot be limited by the hardware mentioned earlier. It should be noted that hardware is primarily intended to solve a narrow problem. As time goes by and as technology develops, this type of task becomes more complex or evolves. New tools arise that are capable of meeting new demands. In this sense, it is appropriate to look at this hardware from the point of view of the class of technical tasks it can solve, not simply a technical implementation on some set of hardware components.

Figure 5:
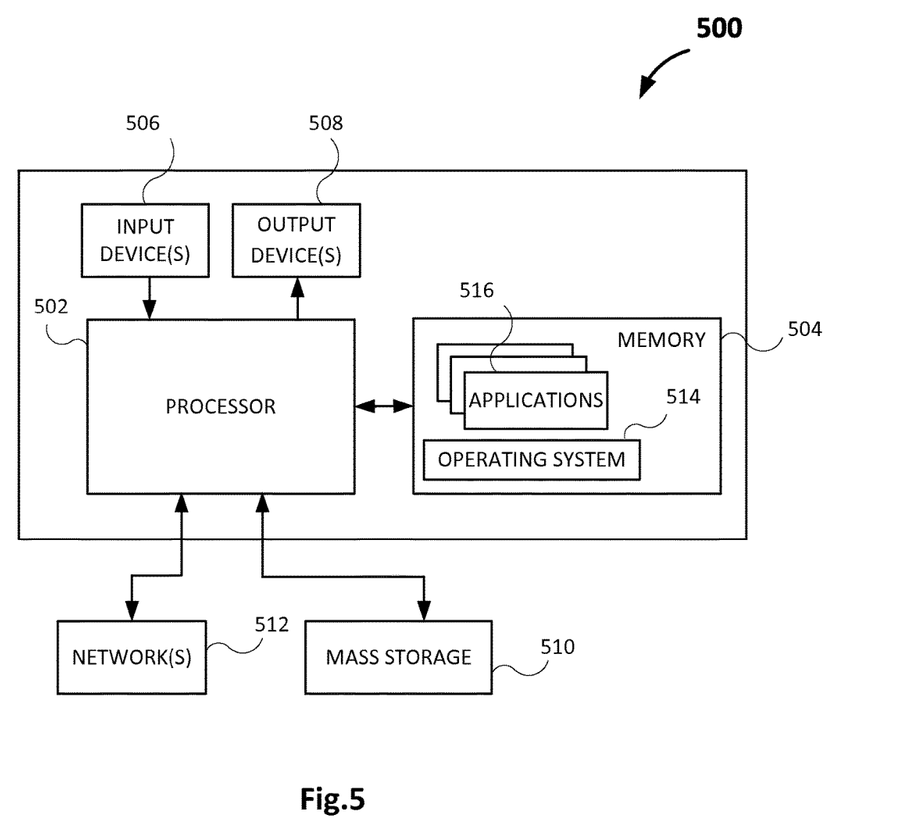
FIG. 5 shows an exemplary computer system that can be used to implement the present invention.

FIG. 5 illustrates an exemplary computer system 500 that in some implementations is used with the present invention, as described above. The system 500 includes one or more processors 502 connected to a memory 504. The processor(s) 502 may contain one or more computer cores or may be a chip or other device capable of performing computations. The memory 504 may be random access memory (RAM) and may also contain any other types or kinds of memory, particularly non-volatile memory devices (such as flash drives) or permanent storage devices such as hard drives, etc. In addition, an arrangement can be considered in which the memory 504 includes remotely located information-storage media, as well as local memory such as cache memory in the processor(s) 502, used as virtual memory and stored on an external or internal permanent memory device 510.

The computer system 500 also usually includes input and output ports to transfer information out and receive information. For interaction with a user, the computer system 500 may contain one or more input devices 506 (such as a keyboard, a mouse, a scanner, or other) and output devices 508 (such as displays or special indicators). The computer system 500 may also have one or more permanent storage devices 510 such as an optical disk drive (CD, DVD, or other), a hard disk, or a tape drive. In addition, the computer system 500 may have an interface with one or more networks 512 that provide connection with other networks and computer equipment. In particular, this may be a local area network (LAN) or a Wi-Fi network, and may or may not be connected to the World Wide Web (Internet). It is understood that the computer system 500 may include analog and/or digital interfaces between the processor 502 and each of the components 504, 506, 508, 510 and 512.

The computer system 500 is managed by an operating system 514 and includes various applications, components, programs, objects, modules and other, designated by the consolidated number 516.

The programs used to accomplish the methods corresponding to this invention may be a part of an operating system or may be a specialized peripheral, component, program, dynamic library, module, script, or a combination thereof.

This description shows the basic inventive concept of the inventors, which cannot be limited by the hardware mentioned earlier. It should be noted that hardware is primarily intended to solve a narrow problem. As time goes by and as technology develops, such a task becomes more complex or it evolves. New tools arise that are capable of meeting new demands. In this sense, it is appropriate to look at this hardware from the point of view of the class of technical tasks they solve, not simply as a technical implementation on some elementary framework.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The invention claimed is:

1. A method comprising:

identifying a sentence;

identifying a graph of generalized constituents of the sentence based on rough syntactic analysis of a lexical-morphological structure of the sentence, wherein the graph of generalized constituents comprises arcs and nodes, wherein each of the nodes represents a constituent of the sentence comprising one or more words in the sentence that function as a unit within the sentence, and wherein each of the arcs between a pair of the nodes represents a syntactic slot expressing a type of relationship between lexical values of the pair;

filtering, by a data processing apparatus, the arcs of the graph of generalized constituents using a combination classifier comprising a tree classifier and at least one linear classifier, wherein the tree classifier divides the arcs into clusters based on a predetermined set of symbolic features, and wherein the linear classifier filters the clusters of the arcs based on combinations of numerical features for each of the clusters; and identifying, by the data processing apparatus, a syntactic structure of the sentence by performing precise syntactic analysis of the sentence based on the graph of generalized constituents of the sentence with the filtered clusters of the arcs.

2. The method of claim 1, wherein the predetermined set of symbolic features comprises one or more of a type of sentence part of one of the lexical values in the pair, a role of one of the lexical values in the pair, or a number of steps between the pair of the lexical values in a syntactic tree.

3. The method of claim 1, wherein each of the numerical features comprises a rating for one or more of a lexical meaning, a filler, a punctuation, or a semantic description for the lexical values in the pair.

4. The method of claim 1, wherein the predetermined set of symbolic features is based on parallel analysis of a two-language text corpus.

5. The method of claim 1, wherein an order of symbolic features in the predetermined set of symbolic features is determined based on entropy measures of the symbolic features.

6. The method of claim 1, wherein the tree classifier is based on an Iterative Dichotomiser 3 (ID3) algorithm.

7. The method of claim 1, wherein the numerical features comprise weights that are based on parallel analysis of a two-language text corpus.

8. Non-transitory computer storage media having instructions stored therein that, when executed by a data processing apparatus, cause the data processing apparatus to:

identify a sentence;

identify a graph of generalized constituents of the sentence based on rough syntactic analysis of a lexical-morphological structure of the sentence, wherein the graph of generalized constituents comprises arcs and nodes, wherein each of the nodes represents a constituent of the sentence comprising one or more words in the sentence that function as a unit within the sentence, and wherein each of the arcs between a pair of the nodes represents a syntactic slot expressing a type of relationship between lexical values of the pair;

filter, by the data processing apparatus, the arcs of the graph of generalized constituents using a combination classifier comprising a tree classifier and at least one linear classifier, wherein the tree classifier divides the arcs into clusters based on a predetermined set of symbolic features, and wherein the linear classifier filters the clusters of the arcs based on combinations of numerical features for each of the clusters; and identify, by the data processing apparatus, a syntactic structure of the sentence by performing precise syntactic analysis of the sentence based on the graph of generalized constituents of the sentence with the filtered clusters of the arcs.

9. The non-transitory computer storage media of claim 8, wherein the predetermined set of symbolic features comprises one or more of a type of sentence part of one of the lexical values in the pair, a role of one of the lexical values in the pair, or a number of steps between the pair of the lexical values in a syntactic tree.

10. The non-transitory computer storage media of claim 8, wherein each of the numerical features comprises a rating for one or more of a lexical meaning, a filler, a punctuation, or a semantic description for the lexical values in the pair.

11. The non-transitory computer storage media of claim 8, wherein the predetermined set of symbolic features is based on parallel analysis of a two-language text corpus.

12. The non-transitory computer storage media of claim 8, wherein an order of symbolic features in the predetermined set of symbolic features is determined based on entropy measures of the symbolic features.

13. The non-transitory computer storage media of claim 8, wherein the tree classifier is based on an Iterative Dichotomiser 3 (ID3) algorithm.

14. The non-transitory computer storage media of claim 8, wherein the numerical features comprise weights that are based on parallel analysis of a two-language text corpus.

15. A system comprising:

a data processing apparatus; and a computer-readable medium having instructions stored therein that, when executed by the data processing apparatus, cause the data processing apparatus to:

identify a sentence;

identify a graph of generalized constituents of the sentence based on rough syntactic analysis of a lexical-morphological structure of the sentence, wherein the graph of generalized constituents comprises arcs and nodes, wherein each of the nodes represents a constituent of the sentence comprising one or more words in the sentence that function as a unit within the sentence, and wherein each of the arcs between a pair of the nodes represents a syntactic slot expressing a type of relationship between lexical values of the pair;

filter the arcs of the graph of generalized constituents using a combination classifier comprising a tree classifier and at least one linear classifier, wherein the tree classifier divides the arcs into clusters based on a predetermined set of symbolic features, and wherein the linear classifier filters the clusters of the arcs based on combinations of numerical features for each of the clusters; and identify a syntactic structure of the sentence by performing precise syntactic analysis of the sentence based on the graph of generalized constituents of the sentence with the filtered clusters of the arcs.

16. The system of claim 15, wherein the predetermined set of symbolic features comprises one or more of a type of sentence part of one of the lexical values in the pair, a role of one of the lexical values in the pair, or a number of steps between the pair of the lexical values in a syntactic tree.

17. The system of claim 15, wherein each of the numerical features comprises a rating for one or more of a lexical meaning, a filler, a punctuation, or a semantic description for the lexical values in the pair.

18. The system of claim 15, wherein the predetermined set of symbolic features is based on parallel analysis of a two-language text corpus.

19. The system of claim 15, wherein an order of symbolic features in the predetermined set of symbolic features is determined based on entropy measures of the symbolic features.

20. The system of claim 15, wherein the tree classifier is based on an Iterative Dichotomiser 3 (ID3) algorithm.

21. The system of claim 15, wherein the numerical features comprise weights that are based on parallel analysis of a two-language text corpus.

* * * * *